Patented Sept. 12, 1950

2,522,014

UNITED STATES PATENT OFFICE 2,522,014

PROCESS OF PREPARING COFFEE EXTRACT

Pierre A. Bacot, Le Mans, France, assignor Societe Immobiliere & Financiere du Parc (Societe a Responsabilite Limitee), Ivry-sur-Seine, France, a company of France No Drawing. Application August 31, 1948, Serial No. 47,145. In France September 25, 1947

9 Claims. (Cl. 99—71)

1

Various processes have already been proposed for producing solid products soluble either in cold water or in hot water, from coffee beans but it is very difficult to succeed in obtaining a thoroughly soluble product retaining the natural taste and dietetic properties of coffee.

It is an object of this invention to provide an improved process in which the above difficulty is removed.

The essential steps of the process according to this invention comprise subjecting an aqueous suspension of ground, roasted coffee beans to a distillation under a reduced pressure, at a low temperature, condensing the vapours, preferably under a reduced pressure until a weight of condensed liquid substantially equal to half the weight of original coffee has been collected, then subjecting the remainder of the aqueous suspension to a systematic extraction by means of water at a temperature of the order of 90–95° C., the amount of water being substantially equal to the weight of original coffee.

When so working, it is possible, after drying, to obtain a solid product which is thoroughly soluble in water and contains, in fixed and stable condition, all the original components of coffee, particularly fatty materials, caffeine, cafetannic acid and aromatic oils.

In carrying out this process, precautions are advisable in the step of preparing the starting aqueous suspension. Firstly, it is desirable to roast green beans very slowly with a view to avoiding cameilzation of carbohydrates; the roasted coffee beans may then be coated for the purpose of retaining aromatic oils therein if grinding is not to take place immediately after roasting.

Coffee beans are then ground, after which an aqueous slurry or suspension is formed therefrom by kneading with water, preferably at a temperature of 40–50° C. for about an hour; the amount of water to be used is about 3 parts by weight to one part of coffee.

The aqueous slurry or suspension is then distilled without reflux, preferably at a temperature not above 42° C. in a vacuo of 70 cm. of mercury, so as to avoid any oxidation and interreaction of the various essential oils. A distillate is gathered from the beginning of distillation until about 0.5 part of liquid is obtained (for 1 part of ground, roasted coffee beans).

For extraction of the slurry or suspension left behind in the boiler of the distilling apparatus by means of water, it is preferable to work in an extractor battery as hereinafter described. Let us assume that all extractors in the battery except one are filled with aqueous coffee suspension or slurry at various stages of exhaustion; the empty extractor is filled with slurry transferred directly from the distilling apparatus, water at a temperature of 90–95° C. is passed downwardly through the successive extractors beginning with that in which the content is almost exhausted, and ending with the freshly filled extractor, through which water is passed upwardly; the slurry in the last-named extractor is thus heated and any air in the same is forced out.

A liquor containing about 40 g. of dry material per litre is obtained at the exit of the battery; it will be obvious that the same amount of liquid is thus passed through each extractor. The extractor containing completely spent coffee-grounds is then emptied, and filled again with fresh slurry or suspension. Water is then passed through the battery, ending with the last-named extractor. A counter-current extraction is thus effected but water is passed through the last extractor in reverse direction. The liquid issuing from the last extractor in every extraction is dumped into a vat. As an average, the extract has the following composition:

|  | Grams per litre |
|---|---|
| Dry extract | 30–40 |
| Ashes | 0.3–0.4 |
| Caffeine | 0.005–010 |

This aqueous extract may then be concentrated to provide a syrup containing 45 per cent of dry materials, and drying may be completed in the absence of air, for example in an atmosphere of nitrogen under reduced pressure.

For the purpose of obtaining a soluble coffee extract, the solid product from the last-named drying step is blended with distillate obtained as above described, then drying is completed in the absence of oxygen, at a low temperature, to provide the final dry product.

For preparing a soluble coffee extract, it is preferred to add sugar or a soluble, hydrolyzed derivative thereof such as glucose, dextrose, maltose, before final drying, so that the reducing action of such sugars is taken advantage of for preventing aromatic components to distill off; it is thus possible directly to obtain a sugared, soluble coffee extract.

A similar result may be obtained by adding coffee-substitutes as produced from fecula, starch and the like to coffee. In such a case, these carbohydrates are subjected separately to a hydrolysis, either through a diastasic way or through a chemical way (boiling in dilute acid medium) so as to convert the same to sugars (glucose, dextrose or maltose). The sugared liquor thus produced is then concentrated to yield a syrup containing about 45 per cent of dry materials. The syrup may then be blended with the syrup obtained through aqueous extraction of the coffee slurry which has been de-aromatized through distillation, and the mixture may be dried as above described.

The mixture of solid extract and sugared distillate is finally dried at a temperature not above 65° C. in an inert atmosphere with a slight pressure reduction of the order of twenty centimeters of water.

An important application of the process above described is the production of a soluble product which yields with water a breakfast beverage on the basis of milk, sugar and coffee.

The process for the production of such a product broadly comprises forming a mixture from powdered milk, sugar and concentrate obtained after aqueous extraction of dearomatized coffee as above described, effecting homogenisation at a low temperature in an atmosphere having a low oxygen content, drying the mixture and incorporating therein aromatic substances obtained as distillation heads from a coffee slurry, then completing distillation as above set forth.

In carrying out this process, it is desirable to work as described below.

A standard milk containing 30 g. of fatty materials per litre and the pH-value of which has previously been adjusted to 6.5 say by adding disodium phosphate, is employed as a starting material; 0.01 per cent of an antioxidant soluble in water, for example an unbleached corn extract, flour of white oats of the "avenex" type, rye flour or the like, i. e. any one of the substances commonly used for stabilising milk product, is added to the milk.

The milk thus prepared is homogenised immediately under a pressure of 200 kg. per sq. cm. at a temperature as close as possible to pasteurisation temperature, preferably 85° C., then the milk is cooled to a low temperature (about 8° C.).

It is then concentrated under a pressure of 65 cm. of mercury at a temperature not above 55° C., after which the milk thus treated is dried by being sprayed through nozzles on an atomizing disk in air at a temperature of about 85° C.

All the foregoing steps should be effected rapidly in order to avoid any alteration and conversion of albuminous materials, tending to lessen solubility.

The powder thus produced should have the following average composition:

| | Per cent by weight |
|---|---|
| Water | 3.50 |
| Fats | 24.10 |
| Lactose | 38.60 |
| Casein | 26.50 |
| Inorganic salts | 5.80 |
| Lactic acid | 1.50 |

It should be understood that the above, preferred manner of producing milk powder is not the only one that can be employed, as milk powder obtained according to other known processes can also be used; however the precautions stated above allow of obtaining a particularly desirable product.

Milk powder is then mixed with sugared, dearomatised coffee extract while said extract is still warm; the following proportions are preferred:

| | Parts by weight |
|---|---|
| Milk powder | 100 |
| Sugar | 60 |
| Coffee extract | 12 |

Mixing may be effected in a kneading machine, under a reduced pressure, at a temperature of about 65° C. for an hour; mechanical stirring is necessary to secure perfect homogeneity of the mixture. The mixture is then cooled to +10° C. while passing a nitrogen draught over the liquid surface to avoid oxidizing action of air.

Immediately after this treatment, the aroma of the white coffee thus prepared is strengthened by incorporating aromatic substances which were left aside after the first extraction step, for example in the following proportions:

| | Grams |
|---|---|
| White coffee powder | 100 |
| Aromatic substances | 2 |

The mixture thus prepared is then ground for 30 minutes in a ball mill in the absence of air, in an inert gas atmosphere, to secure thorough homogeneity.

The ground product is then dried in the manner described in connection with coffee extract without milk.

The final composition of the product is as follows (reckoned on 100 g.):

| | |
|---|---|
| Water | 4.50 |
| Fatty materials | 13.75 |
| Nitrogen containing materials | 15.18 |
| Lactose | 23.01 |
| Saccharose | 34.57 |
| Soluble coffee | 5.44 |
| Inorganic salts | 3.15 |

There is thus obtained a breakfast product from milk, sugar and coffee, in which coffee is wholly fixed in soluble form to milk and sugar; the product is healthy, easily digestible and rich in fatty substances. It keeps quite well in cool places.

The product may be employed, for example, as follows:

100 g. of the powdered product are dissolved in a litre of warm water at a temperature of about 40–50° C.; after complete dissolution, the whole is heated to about 90° C. and the beverage may be drunk hot or cold.

This invention comprises the products prepared as above described.

What I claim is:

1. In the production of a coffee extract, the steps of distilling an aqueous suspension of ground, roasted coffee beans under a sub-atmospheric pressure, at a temperature not above 42° C., thus producing vapours; condensing said vapours until a weight of condensed liquid substantially equal to the weight of starting coffee has been collected and thereupon terminating distillation; and extracting the remainder of said aqueous suspension with water at a temperature of about 90–95° C.

2. In the production of a coffee extract, the steps of distilling an aqueous suspension of ground, roasted coffee beans under a pressure of about 70 cm. of mercury at a temperature not above 42° C., thus producing vapours; condensing said vapours until a weight of condensed liquid substantially equal to the weight of starting coffee has been collected and thereupon terminating distillation; and extracting the remainder of said aqueous suspension with a weight of water at a temperature of about 90–95° C., which is substantially equal to the weight of starting coffee.

3. In the production of a coffee extract, the steps of kneading a powder of slowly roasted coffee with about three times its weight of water at a temperature of about 40–50° C. to form an aqueous suspension of said powder; distilling said suspension under a pressure of about 70 cm. of mercury at a temperature not above 42° C., thus producing vapours; condensing said vapours until a weight of condensed liquid substantially equal to the weight of starting coffee has been collected and thereupon terminating distillation; and extracting the remainder of said aqueous suspension with a weight of water at a temperature of about 90–95° C., which is substantially equal to the weight of starting coffee.

4. A process for the production of a coffee extract which comprises distilling an aqueous suspension of ground, roasted coffee beans under a sub-atmospheric pressure, at a temperature not above 42° C., thus producing vapours; condensing said vapours until a weight of condensed liquid substantially equal to the weight of starting coffee has been collected and thereupon terminating distillation; extracting the remainder of said aqueous suspension with water at a temperature of about 90–95° C.; concentrating said extract to obtain a syrup; and drying said syrup in an atmosphere devoid of free oxygen, under a sub-atmospheric pressure.

5. The process of claim 4, which further comprises adding at least one sugar selected from the group of saccharose and hexoses to said syrup before drying the same.

6. The process of claim 4, the last two steps comprising concentrating said extract to obtain a syrup containing about 45 per cent of dry substances; and drying said syrup in an atmosphere devoid of free oxygen at a temperature not above 45° C., under a pressure of about 20 cm. of water.

7. The process of claim 4, which further comprises blending at least a portion of said condensed liquid with the dried syrup finally obtained; and drying the mixture thus obtained in an atmosphere devoid of free oxygen, under a sub-atmospheric pressure.

8. The process of claim 9, which further comprises blending a sugar substance selected from the group of saccharose and hexoses, together with said milk powder and said aqueous extract, the homogenising step comprising kneading said sugar substance, milk powder and aqueous extract at a temperature of about 65° C., under a sub-atmospheric pressure, then cooling the kneading product to a temperature of about 10° C. in an atmosphere devoid of free oxygen.

9. A process for the production of a water-soluble, white coffee extract, which comprises distilling an aqueous suspension of ground, roasted coffee beans under a sub-atmospheric pressure at a temperature not above 42° C., thus producing vapours; condensing said vapours until a weight of condensed liquid substantially equal to the weight of starting coffee has been collected and thereupon terminating distillation; extracting the remainder of said aqueous suspension with a weight of water at a temperature of about 90–95° C., which is substantially equal to the weight of starting coffee, thereby obtaining an aqueous extract; blending milk powder with said aqueous extract; homogenising the mixture of milk powder and aqueous extract thus produced, at a low temperature in an atmosphere devoid of free oxygen; drying said mixture; blending at least a portion of said condensed liquid with the mixture thus dried; and drying the blending product thus obtained in an atmosphere devoid of free oxygen under a sub-atmospheric pressure.

PIERRE A. BACOT.

REFERENCES CITED

The following references are of record in the file of this patent:

UNITED STATES PATENTS

| Number | Name | Date |
| --- | --- | --- |
| 48,268 | Gale | June 20, 1865 |
| 1,365,443 | Anhaltzer | Jan 11, 1921 |
| 1,367,715 | Pratt et al. | Feb. 8, 1921 |
| 1,367,724 | Trigg | Feb. 8, 1921 |
| 2,116,308 | Gore | May 3, 1938 |
| 2,340,989 | Salkin | Feb. 8, 1944 |

FOREIGN PATENTS

| Number | Country | Date |
| --- | --- | --- |
| 19,882 of 1889 | Great Britain | Dec. 1889 |